(12) United States Patent
Spanswick et al.

(10) Patent No.: US 10,247,096 B2
(45) Date of Patent: Apr. 2, 2019

(54) MODULAR GAS TURBINE INLET COOLING SYSTEMS

(71) Applicant: S&T Mfg. Co., Tulsa, OK (US)

(72) Inventors: Ian Spanswick, York, PA (US); Gary Hilberg, Cypress, TX (US)

(73) Assignee: S&T Mfg. Co., Tulsa, OK (US)

( * ) Notice: Subject to any disclaimer, the term of this patent is extended or adjusted under 35 U.S.C. 154(b) by 0 days.

(21) Appl. No.: 15/901,452

(22) Filed: Feb. 21, 2018

(65) Prior Publication Data

US 2018/0238237 A1 Aug. 23, 2018

Related U.S. Application Data

(60) Provisional application No. 62/462,109, filed on Feb. 22, 2017.

(51) Int. Cl.
| | |
|---|---|
| *F02C 7/143* | (2006.01) |
| *F02C 7/18* | (2006.01) |
| *F02C 7/04* | (2006.01) |
| *F02C 7/052* | (2006.01) |
| *F02C 6/00* | (2006.01) |

(52) U.S. Cl.
CPC ............. *F02C 7/143* (2013.01); *F02C 7/04* (2013.01); *F02C 7/052* (2013.01); *F02C 7/18* (2013.01); *F02C 6/00* (2013.01); *F05D 2260/205* (2013.01); *F05D 2260/213* (2013.01); *F05D 2260/234* (2013.01); *F05D 2260/607* (2013.01)

(58) Field of Classification Search
CPC .... F02C 7/12; F02C 7/14; F02C 7/143; F02C 7/04; F02C 7/18; F02C 7/052; F02C 6/00; F05D 2260/213; F05D 2260/205; F05D 2260/234; F05D 2260/607
See application file for complete search history.

(56) References Cited

U.S. PATENT DOCUMENTS

| | | | | |
|---|---|---|---|---|
| 5,083,423 | A * | 1/1992 | Prochaska | F02C 7/04 60/772 |
| 6,055,818 | A | 5/2000 | Valle et al. | |
| 2001/0054354 | A1 | 12/2001 | Baudat et al. | |
| 2004/0016245 | A1* | 1/2004 | Pierson | F01K 23/10 62/175 |
| 2008/0298957 | A1* | 12/2008 | Chillar | F02C 7/04 415/177 |

(Continued)

FOREIGN PATENT DOCUMENTS

WO 2011/100663 A2 8/2011

OTHER PUBLICATIONS

International Search Report and Written Opinion for PCT/2018/019013, dated May 17, 2018, 13 pages.

*Primary Examiner* — Craig Kim
(74) *Attorney, Agent, or Firm* — Seed IP Law Group LLP

(57) ABSTRACT

An inlet cooling system unit that is fluidly coupled to a gas turbine can include a filter module configured to filter inlet air, a chiller module configured to cool inlet air, and a framework. The framework is sized and shaped to define a filer module receiving region which supportably receives the filter module, and a chiller module receiving region which supportably receives the chiller module, the chiller module receiving region located below the filter module receiving region such that the chiller module is received below the filter module. Related gas turbine inlet cooling systems are also provided.

15 Claims, 7 Drawing Sheets

(56) References Cited

U.S. PATENT DOCUMENTS

| | | | |
|---|---|---|---|
| 2011/0197592 A1* | 8/2011 | Bezat | F02C 7/047 |
| | | | 60/772 |
| 2013/0011244 A1 | 1/2013 | Hao et al. | |
| 2013/0087045 A1* | 4/2013 | Sullivan | F02C 7/05 |
| | | | 95/273 |
| 2013/0186117 A1* | 7/2013 | Desai | F02C 7/143 |
| | | | 62/94 |
| 2014/0060774 A1* | 3/2014 | Motakef | F02C 7/047 |
| | | | 165/48.1 |
| 2016/0237902 A1* | 8/2016 | Zhang | F02C 7/143 |
| 2017/0067396 A1* | 3/2017 | Kustura | F02C 7/141 |

\* cited by examiner

MODULAR GAS TURBINE INLET COOLING SYSTEMS

BACKGROUND

Technical Field

The present disclosure relates to gas turbine systems and, more particularly, to modular gas turbine inlet cooling systems.

Description of the Related Art

Gas turbines are frequently used in an industrial environment to generate energy. Operating gas turbines requires directing large volumes of air, often referred to as inlet air, into compressors of gas turbines. Inlet air entering gas turbines results in large quantities of impurities and foreign matter entering the gas turbines. As a result, gas turbines are connected to filtration units that are positioned remote from the gas turbines and designed to filter the impurities and foreign matter from the inlet air entering the gas turbines. In addition, gas turbines often require the inlet air temperatures to be reduced to increase power output. Typical solutions for cooling inlet air temperatures can be achieved by providing coil arrangements, more generally heat exchangers that are fluidly connected to the filter houses to remove heat from inlet air before reaching the compressors of the gas turbines. However, such systems require cooling coils that are positioned in lower velocity areas, for example, downstream of the filter houses, which require complex ducting, coil tubes (typically made of copper and caged with aluminum fins), and other components that increase the footprint of the filter houses and/or cooling systems. Further, such systems require costly and complex structures to support both the filter houses and/or cooling systems and, consequently, reduce compactness and modularity of such systems.

BRIEF SUMMARY

In various implementations, inlet cooling system units and related systems with robust, compact, modular, and efficient form factors enable ease of transportability, assembly, and reduced footprints. In one example implementation, an inlet cooling system unit fluidly coupled to a gas turbine can be summarized as including a filter module configured to filter inlet air; a chiller module configured to cool inlet air; and a framework. The framework can be sized and shaped to define a filer module receiving region which supportably receives the filter module; and a chiller module receiving region which supportably receives the chiller module, the chiller module receiving region located below the filter module receiving region such that the chiller module is supported by the framework below the filter module.

In one example implementation, a gas turbine inlet cooling system that receives inlet air can be summarized as including a coolant source that supplies a coolant; and a chiller module. The chiller module can have a wall enclosure; at least a first chiller coil unit integrated with the wall enclosure, the first chiller coil unit configured to receive the inlet air; and a pump fluidly coupled to the coolant source, the pump circulating the coolant to the first chiller coil unit, flow of the inlet air through the chiller coil unit removing heat from the inlet air to generate cool inlet air. The gas turbine inlet cooling can also include a filter module fluidly coupled to the chiller module, the filter module receiving cool inlet air from the chiller coil unit, the filter module including at least one filtration medium which receives the cool inlet air and filters the cool inlet air to generate filtered inlet air; and a gas turbine fluidly coupled to the filter module, the gas turbine receiving filtered inlet air.

DETAILED DESCRIPTION

In the following description, certain specific details are set forth in order to provide a thorough understanding of various disclosed implementations. One skilled in the relevant art will recognize that implementations may be practiced without one or more of these specific details. In other instances, well-known structures and devices associated with gas turbines, filtration systems, cooling modules, and related apparatuses, systems, and methods may not be shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 5:
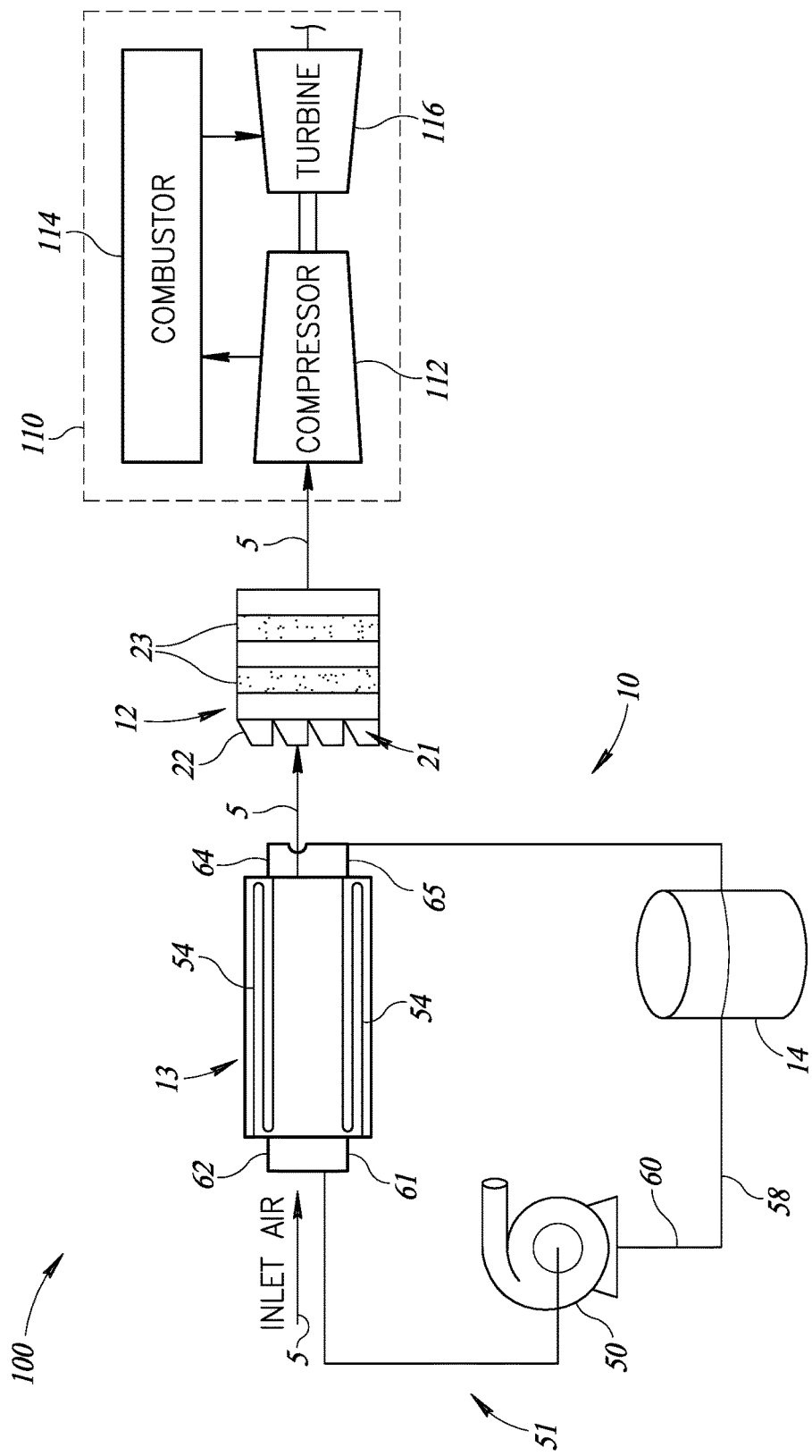
FIG. 5 illustrates a schematic view of a modular cooling system coupled to a gas turbine, according to one example, non-limiting implementation.

FIGS. 1 through 4 illustrate an inlet cooling system unit 10 according to one example, non-limiting implementation. FIG. 5 schematically illustrates a modular cooling system 100 having the inlet cooling system unit 10 fluidly and operably coupled to a gas turbine 110. With reference to FIGS. 1 through 5, the gas turbine 110 can generally include a turbine engine having an inlet, exhaust, compressor 112, combustor 114, and high and low pressure turbines 116a, 116b (collectively 116), among other known components. In some implementations, the compressor 112 and the high pressure turbine 116a can be coupled by a shaft, and the low pressure turbine 116b and a driven load can be coupled by another shaft. Generally, in a known manner, inlet air 5 is directed to the compressor 112, wherein the inlet air 5 is compressed and directed to the combustor 114 and, wherein, the compressed inlet air 5 is mixed with fuel and ignited. The airflow from the combustor 114 drives the rotating turbines 116 to generate power, and is ultimately exhausted through the gas turbine exhaust.

The inlet cooling system unit 10 is generally configured to provide inlet air 5 to the compressor 112 of the gas turbine 110 and includes a filter module 12, a chiller module 13 fluidly and operably coupled to the filter module 12, a coolant fluid source 14 fluidly coupled to the chiller module 13, and framework 15 that supports the filter module 12 and the chiller module 13. The filter module 12 is generally positioned downstream of the chiller module 13 and is configured to draw inlet air 5 that has been cooled via the chiller module 13. In particular, the filter module 12 can include one or more inlets 21 that guide and/or direct inlet air 5 into the filter module 12. For example, in some implementations, the filter module 12 can include a plurality of louvers that are positioned adjacent corresponding inlets 21 to guide and/or direct inlet air 5 into the filter module 12. In some implementations, the filter module 12 can optionally include hoods 22 that are positioned to cover or be mounted over the inlets 21. The hoods 22 may, in some implementations, include panels that are configured to reduce and/or eliminate moisture caused by various conditions, for example, rain, snow, fog, mist, etc. The inlet air 5 drawn into the filter module 12 through the inlets 21 is directed to filtration media 23 positioned in the filter module 12. The filtration media 23 is generally configured to remove or filter undesirable particles from the ambient air, e.g., dusts, snow, ice, dry and/or wet salts, and/or other chlorides, prior to being directed to the gas turbine 110. For example, the filter module 12 can include one or more filtration media 23 arranged in various configurations, with each filtration medium 23 configured to remove various undesirable particles, such as atmospheric dust, carbon, or other impurities from the ambient or inlet air 5 referenced above.

Figure 1:
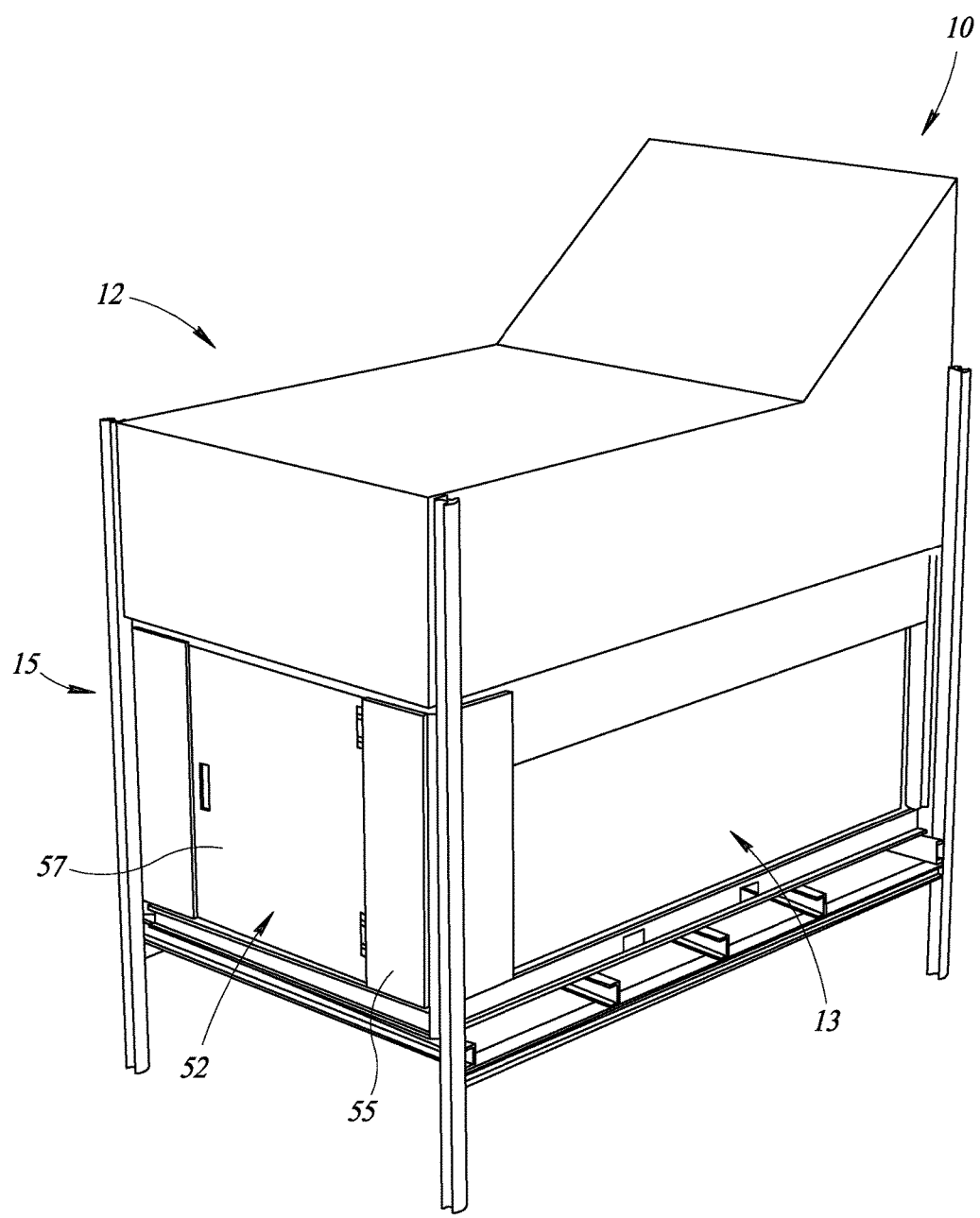
FIG. 1 illustrates a perspective view of a modular cooling system unit, according to one example, non-limiting implementation.
Figure 2:
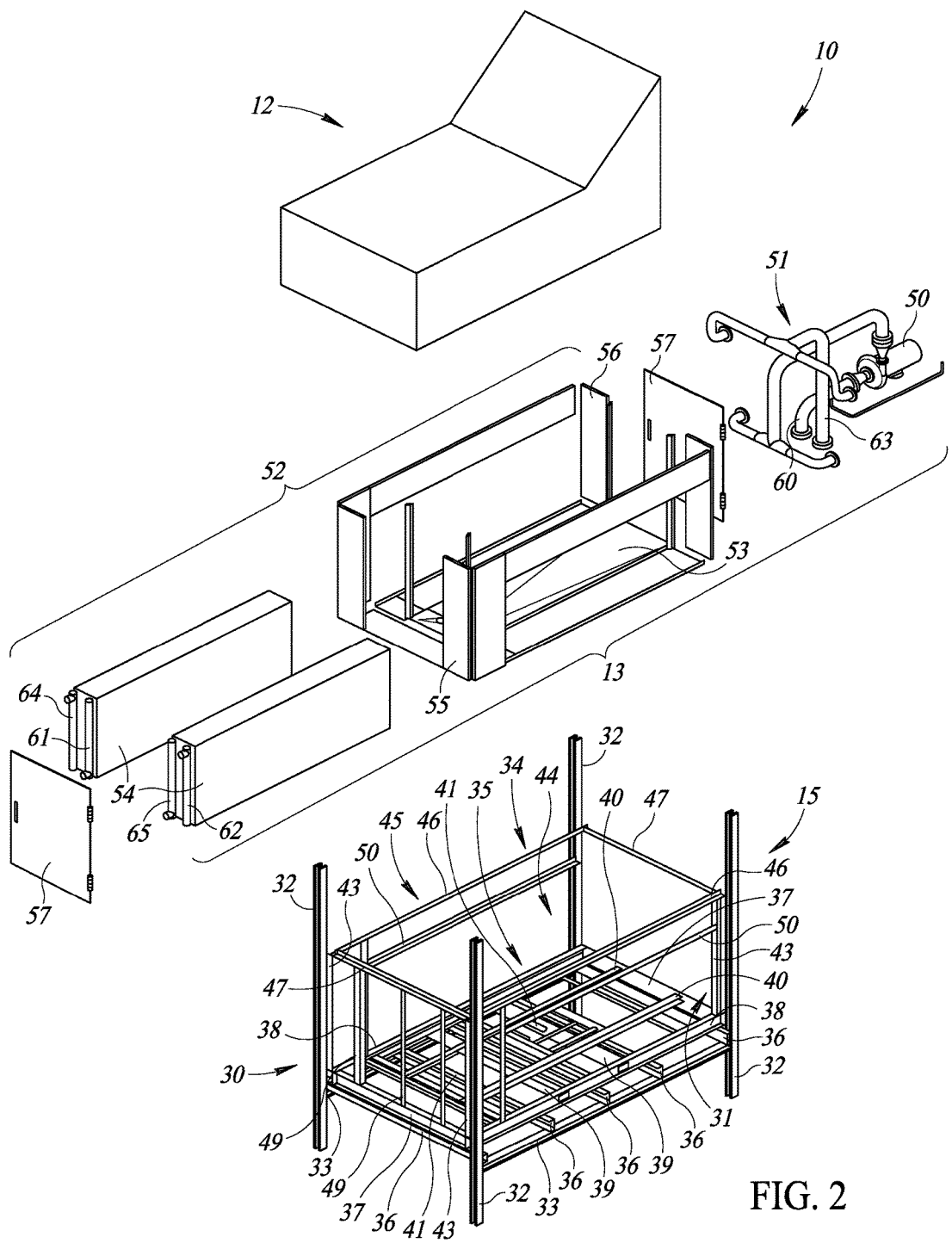
FIG. 2 illustrates an exploded view of the modular cooling system unit of FIG. 1.

As illustrated in FIGS. 1 through 2, the filter module 12 is mounted or supported on the framework 15. The framework 15 is, generally, sized and shaped to collectively support the filter module 12 and the chiller module 13. In particular, the framework 15 includes an exterior grid work 30 and an interior grid work 31. The exterior grid work 30 is constructed via at least a plurality of corner vertical beams 32 and at least a pair of horizontal beams 33. Each horizontal beam 33 is coupled to a pair of opposing corner vertical beams 32. The interior grid work 31 is generally located within an interior region 34 defined by the exterior grid work 30.

In particular, the interior grid work 31 includes a lower frame 35 that is supported on a plurality of lower horizontal beams 36 that are coupled to the pair of horizontal beams 33 of the exterior grid work 30 at opposing ends thereof. The lower frame 35 includes a first pair of opposing lower frame beams 37 coupled to the lower horizontal beams 36 and a second pair of opposing lower frame beams 38 that are coupled to the lower horizontal beams 36 that are located at opposing ends of the lower frame 35. As illustrated in FIG. 2, in some implementations, the interior grid work 31 can include a pair of lower lateral stiffening beams 39 that are coupled to webs of the second pair of lower frame beams 38. For example, one end of the pair of lower lateral stiffening beams 39 can be coupled to one of the pair of second pair of lower frame beams 38 via a recess disposed therein, and another end of the pair of lower lateral stiffening beams 39 can be coupled to a second one of the pair of second pair of lower frame beams 38 via another recess disposed therein. Further, in some implementations, as illustrated in FIG. 2, the interior grid work 31 can include one or more lower longitudinal stiffening beams 40 that extend between the first pair of lower frame beams 37. One end of the lower longitudinal stiffening beams 40 can be coupled to one of the first pair of lower frame beams 37, while another end of the lower longitudinal stiffening beams 40 can be coupled to another one of the first pair of lower frame beams 37. Still further, in some implementations, as illustrated in FIG. 2, the interior grid work 31 can include one or more intercostals 41 that can extend laterally or longitudinally. The intercostals 41 can extend laterally between the lower longitudinal stiffening beams 40. Some intercostals 41 can extend longitudinally between the intercostals 41 that extend laterally.

As illustrated in FIG. 2, the interior grid work 31 includes a plurality of interior vertical beams 43 that are coupled to upper flanges of the second pair of lower frame beams 38 to define a chiller module receiving region 44. At upper ends of the interior vertical beams 43, the interior grid work 31 includes an upper frame 45 that is coupled to the interior vertical beams 43. In particular, the upper frame 45 includes a first pair of opposing upper frame beams 46 that are coupled to a pair of the interior vertical beams 43 located at one end of the interior grid work 31, and a second pair of opposing upper frame beams 47 that are coupled to a pair of the interior vertical beams 43 located at another end of the interior grid work 31. In some implementations, the interior grid work 31 may include one or more stiffening vertical beams 49 that can be coupled to lower flanges of the first and/or second pair of upper frame beams 47, 48 at one end and the first and/or second pair of lower frame beams 37, 38 at another end. In some implementations, the interior grid work 31 may also include stiffening horizontal beams 50 that are coupled to the interior vertical beams 43 and the one or more stiffening vertical beams 49. Each of the various beams described above can include various cross-sectional shapes, for example, T-shape, I-shape, H-shape, z-shape, etc., and can comprise steel, aluminum, titanium, or other materials. Further, each of the beams can be coupled to the other beams via fastening, welding, etc.

Figure 3:
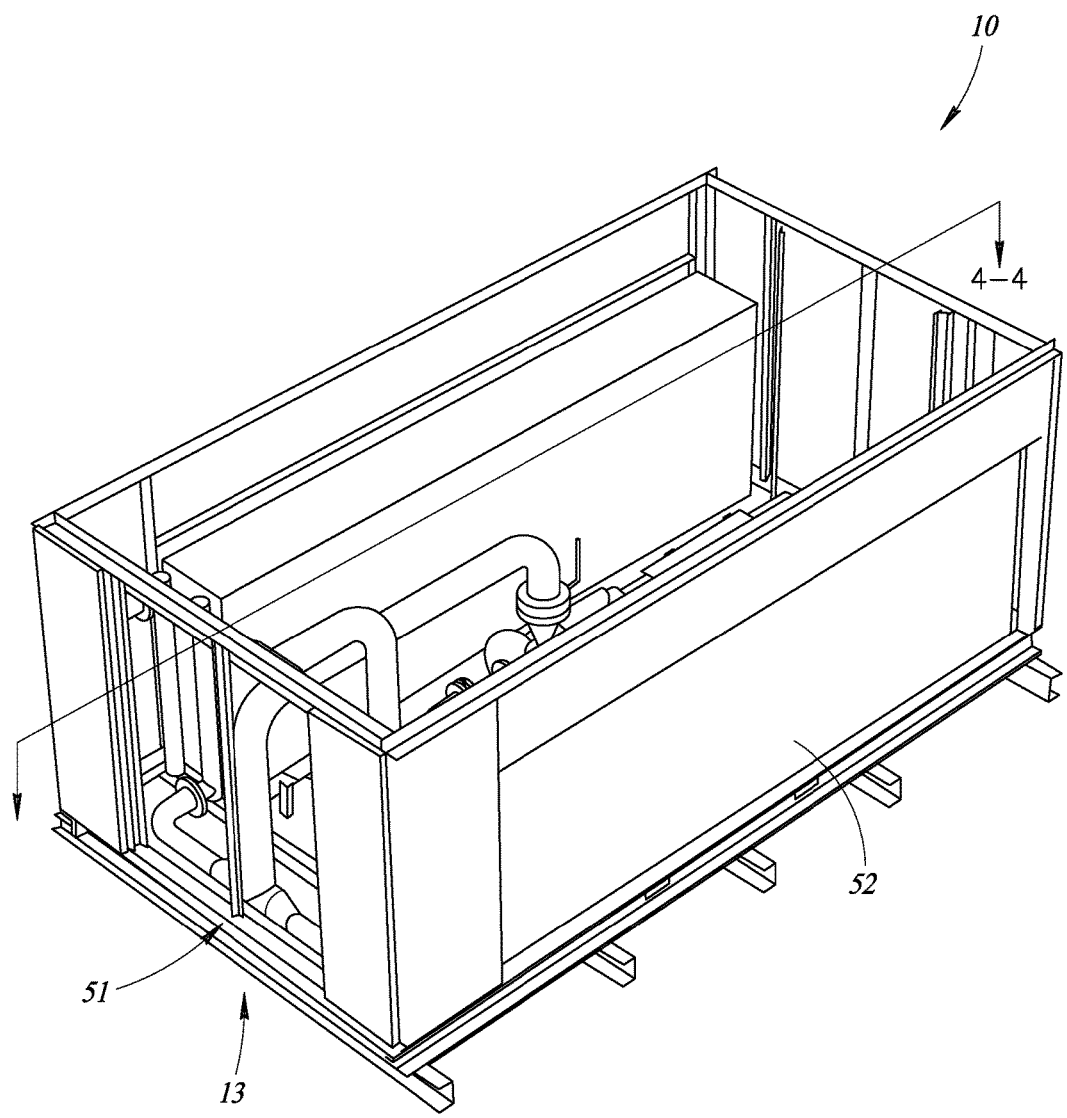
FIG. 3 illustrates a partial perspective view of the modular cooling system unit of FIG. 1 with certain components removed for clarity.
Figure 4:
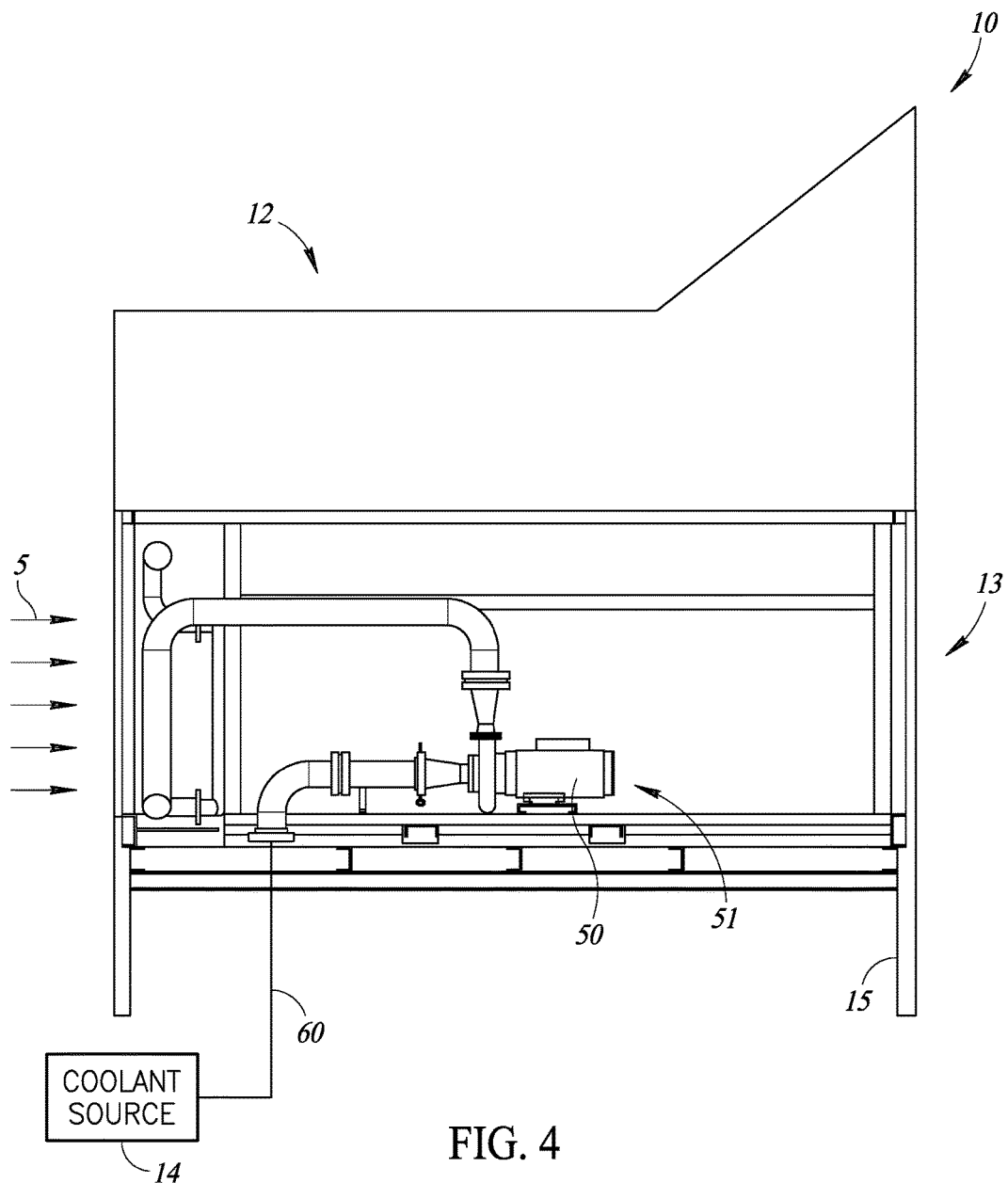
FIG. 4 illustrates a sectional view of the modular cooling system unit of FIG. 1 taken along lines 4-4.

More generally, the exterior grid work 30 and the interior grid work 31 are collectively sized and shaped to concurrently support the filter module 12 and the chiller module 13. In particular, the filter module 12 can be supported and/or coupled to the vertical beams 32 and the upper frame 45. In particular, the filter module 12 is positioned to be located on the first and second pair of upper frame beams 47, 48. In this manner, the exterior and interior grid works 30, 31 are sized and shaped to structurally support the filter module 12. As illustrated in FIGS. 1-3, chiller module receiving region 44 is defined between the lower frame 35 and the upper frame 45. The chiller module receiving region 44 is sized, shaped and located below the filter module 12 to improve compactness and modularity of internal cooling system unit 10. Unlike conventional gas turbine cooling systems, which typically include a chilling module coupled to the filter module downstream, positioning the chiller module 13 underneath or below the filter module 12 and fluidly coupled to the filter module 12 upstream improves compactness, modularity and eases transportability. For example, conventional gas turbine cooling systems require a multitude of complex, expensive ducts, and components thereof, that provide passageways for cooling fluid provided to the chillers. Providing a chiller module 13 that can be positioned below, and coupleable to, the filter module 12 allows the chiller module 13 and at least portions of the framework 15, for example, interior grid work 31, to be transportable as a single unit. In some implementations, the chilling module 13 can include one or more pockets that are sized and shaped to be received by forklifts to provide ease of movement, positioning, and transportability. Moreover, the framework 15 can be sized and shaped to support filter modules 12 and chiller modules 13 of a wide variety of weight capacities. In some implementations, the framework 15 can be designed to support a weight capacity of about 10,000 lbs. In other implementations, the portions of the modular cooling system unit 10, for example, the chiller module 13 and at least portions of the framework 15, that can be transportable as a single unit can be sized and shaped to be retrofitted into existing filter units. For instance, the interior grid work 31 can be sized and shaped to be retrofitted into existing exterior grid works, such as those including corner vertical beams 32.

As illustrated in FIGS. 1-2, the chiller module 13 includes a pump 50, plumbing 51, a wall enclosure 52, and a floor panel 53 that can be constructed as a single unit. In particular, the wall enclosure 52 can be formed by a pair of opposing chilling coil units 54 that are integrated into the wall enclosure 52, a front panel 55, and a rear panel 56, where one of the front panel 55 or the rear panel 56 can optionally include a door unit 57. The chilling coil units 54 generally include a plurality of heat exchange coils that are sized and shaped to receive a coolant fluid 58, e.g., water, ethylene glycol, propylene glycol, etc., from the coolant fluid source 14. In some implementations, each chilling coil unit 54 can include louvers that are disposed adjacent to the corresponding chilling coil unit 54. More generally, the chilling coil units 54 are sized and shaped to facilitate heat exchange between the circulating coolant fluid 58 and the inlet air 5, i.e., ambient air that can be received by the chiller module 13, cooled, and directed to the filtration module 12 to remove impurities and thereafter be directed to the gas turbine 110.

Further, in other implementations, the chilling coil units 54 can also be configured to operate via direct refrigerant vaporization. Still further, in other implementations, the ambient air can be received by the filtration module 12, where the ambient air can be filtered to remove impurities, and thereafter be directed to the chiller module 13 to be cooled, and thereafter be directed to the gas turbine 110. In any of such implementations, providing the chiller module 13 with chilling coil units 54 in the wall enclosure 52 improves compactness and modularity, and avoids or limits providing complex and costly ducting that is typically included in conventional gas turbine cooling systems. In some implementations, while not illustrated for the sake clarity of illustration and description, the wall enclosure 52 can further include chilling coil unit panels that can cover the integrated chilling coil units 54, which chilling coil unit panels are disposed adjacent to the respective chilling coil units 54.

Further, as illustrated in FIG. 2 and with continued reference to FIG. 5, the plumbing 51 provided and positioned in the chiller module 13 improves compactness of the inlet cooling system unit 10, as the plumbing 51 can be integrated into the chiller module 13. The plumbing 51 includes a first inlet line 60 that is fluidly coupled to the coolant fluid source 14 and the pump 50. The pump 50 circulates the cooling fluid 58 from the coolant fluid source 14 to a first chilling unit inlet line 61 and a second chilling unit inlet line 62. Both the first and the second chilling inlet lines 61, 62 are fluidly coupled to the respective pair of chilling coil units 54. In this manner, the cooling fluid 58 is directed to both of the pair of chilling coil units 54. The plumbing 51 also includes a return line 63 which is fluidly coupled to a first chilling unit return line 64 and a second chilling unit return line 65, where both first and second chilling unit return lines 64, 65 are fluidly coupled to the pair of corresponding chilling units 54. In this manner, the cooling fluid 58 can exit from the chiller module 13 and be returned to the coolant fluid source 14 to be reused. For example, in some implementations, the cooling fluid 58, after passing through the chilling coil units 54, can be returned via the return line 63 to the coolant fluid source 14, e.g., a thermal tank. The thermal tank can cool the returned cooling fluid 58 and continuously supply cooling fluid 58 to the chiller module 13.

As illustrated in FIG. 2, the wall enclosure 52 includes the front panel 55 coupled to the floor panel 53 and the pair of chilling coil units 54 and the rear panel 56 coupled to the floor panel 53 and the pair of chilling coil units 54. Thus, the wall enclosure 52 forms a structure that surrounds or encloses the chiller module 13. In some implementations, the wall enclosure 52 of the chiller module 13 provides a selectively adjustable bypass of the pair of chilling coil units 54. In particular, it has been discovered through experimentation and testing that gas turbine winter operational efficiency can be improved by selectively providing a bypass area, which bypass area can allow an airstream of the inlet air 5 to at least partially bypass the chilling coil units 54. For instance, providing the bypass as described herein can reduce pressure drop across the chiller module 13. Accordingly, in some implementations, either the front panel 55 or the rear panel 56 can include a door unit 57. The door unit 57 is moveable between open and closed positions, which can selectively provide access to the bypass area to allow the inlet airstream, e.g., inlet air 5, to at least partially bypass the one or more chilling coil units 54. In some implementations, the door units 57 can be sized, shaped, or more generally configured to reduce the pressure drop caused by the chiller module 13 to less than one inch water column.

Figure 6:
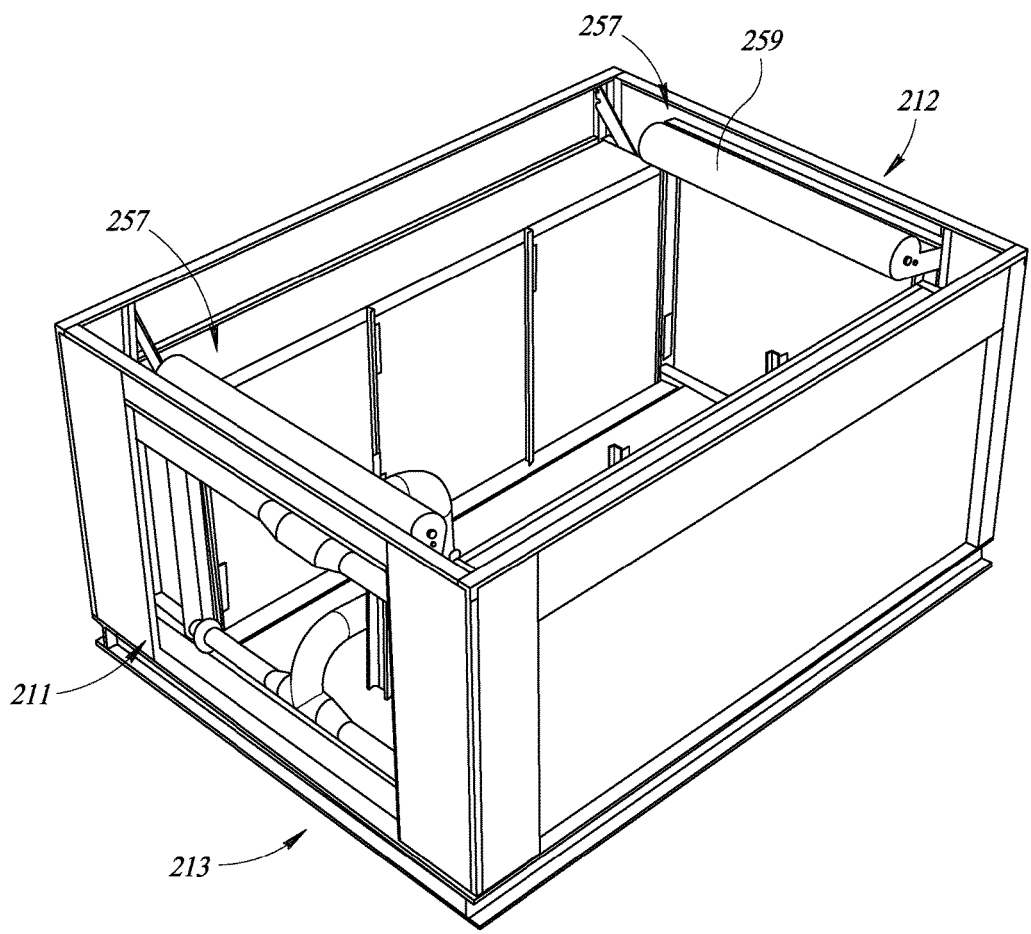
FIG. 6 illustrates a perspective view of a chiller module with one or more doors in an open position, according to one example, non-limiting implementation.
Figure 7:
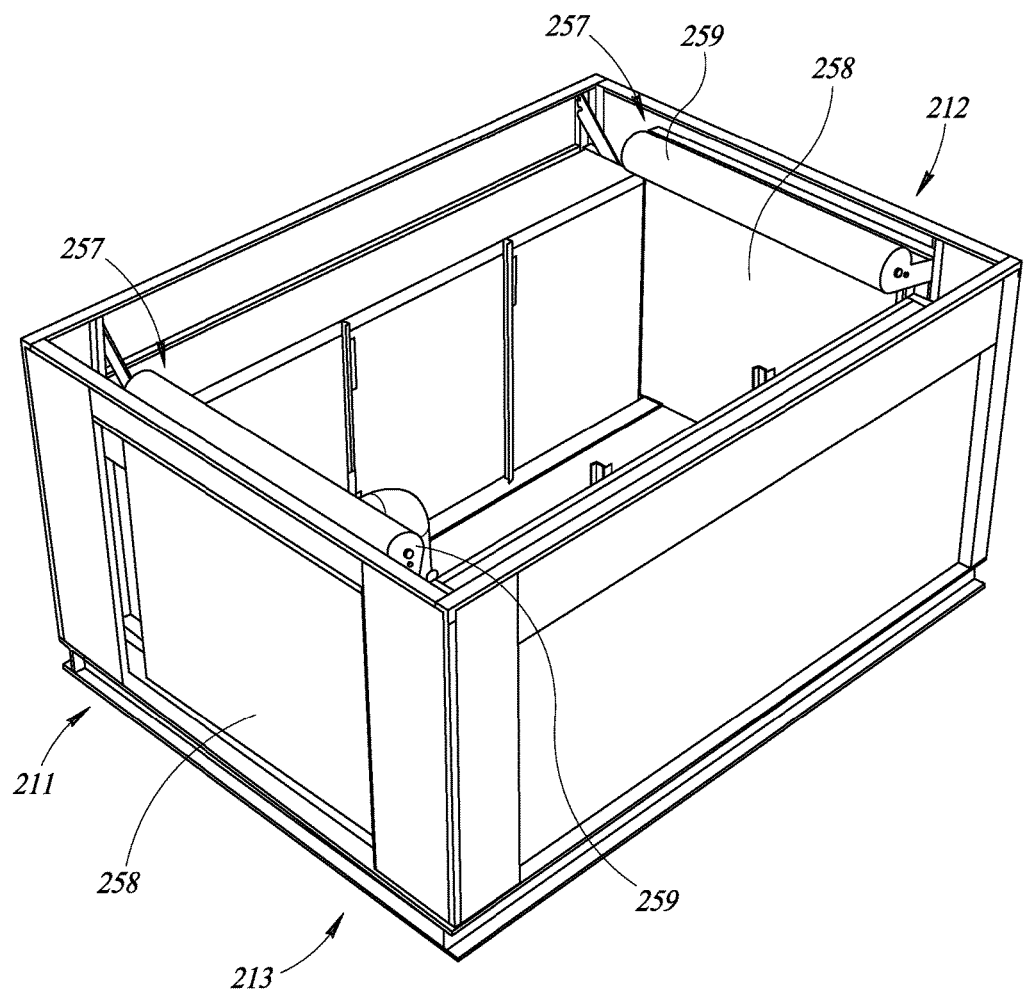
FIG. 7 illustrates a perspective view of the chiller module of FIG. 6 with the one or more doors in a closed position.

FIGS. 6 and 7 illustrate a chiller module 213, according to another example, non-limiting implementation. The chiller module 213 provides a variation in which the chiller module 213 includes one or more rollable-door units 257. The rollable-door units 257 can be disposed adjacent to a front side 211 of the chiller module 213 and/or a rear side 212 of the chiller module 213. As illustrated in FIGS. 6 and 7, the rollable-door units 257 can be configured in an open position and a closed position, respectively. In this variation, the chiller module 213 provides advantageous flexibility in that in some circumstances, where rotatable doors, e.g., door units 57, can be limited in operation due to interference from other adjoining structures, a rollable-door unit 257 can improve compactness of the chiller module 213 by allowing a panel 258 of the rollable-door unit 257 to be moveable along a shaft 259 in a vertical or linear direction.

Referring back to FIG. 5, a modular cooling system 100 is schematically illustrated. As described above, the modular cooling system 100 can include the various implementations of the inlet cooling system unit 10 described herein, which inlet cooling system unit 10 can be fluidly and operably coupled to the gas turbine 110. In operation, the cooling fluid 58 can be drawn from the coolant fluid source 14 via one or more pumps 50. The one or more pumps 50 can circulate the coolant fluid 58 and direct the coolant fluid 58 to the chilling coil units 54. In particular, the plumbing 51 disposed in the chiller modules (e.g., chiller module 13, 213) can include a first inlet line 60 that fluidly couples the coolant fluid 58 to the chilling coil units 54 via respective first and second chilling unit inlet lines 61, 62. Further, as the inlet air 5 is drawn into the chilling coil units 54, for example via louvers disposed on the chilling coil units 54, the circulating coolant fluid 58 facilitates heat exchange between the inlet air 5 and the coolant fluid 58 to reduce temperatures of the inlet air 5. The cooled inlet air 5 is thereafter directed to the filter module 12. In particular, the cooled inlet air 5 can be drawn into the filter module 12 via inlets 21. The cooled inlet air 5 can thereafter be directed through the one or more filtration media 23, wherein any impurities of the cooled inlet air 5 can be removed.

The cooled inlet air 5, after filtration, can be directed to the gas turbine 110. In particular, the cooled inlet air 5 can be directed to the compressor 112, wherein the cooled inlet air 5 can be compressed and directed to the combustor 114, wherein the compressed inlet air 5 can be mixed with fuel and ignited. Again, the airflow from the combustor 114 can drive the turbine 116 to generate power.

Moreover, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An inlet cooling system unit fluidly coupled to a gas turbine, the unit comprising:
 a filter module configured to filter inlet air;
 a chiller module configured to cool inlet air; and
 a framework that includes a lower frame and an upper frame, the lower frame defining a floor of the inlet cooling system unit, the lower frame and the upper frame vertically spaced apart along a vertical axis of the inlet cooling system unit, an arrangement of the lower frame relative to the upper frame defining:
 a chiller module receiving region sized and shaped to receive
 the chiller module, the chiller module supportably received on the lower frame between the lower frame and the upper frame; and
 a filter module receiving region sized and shaped to receive the filter module, the filter module supportably received by the upper frame and positioned above the chiller module relative to the floor of the inlet cooling system unit.

2. The inlet cooling system unit of claim 1, wherein the chiller module includes a wall enclosure that surrounds the chiller module.

3. The inlet cooling system unit of claim 2, wherein at least one side of the wall enclosure includes a chilling coil unit.

4. The inlet cooling system unit of claim 2, further comprising:
 a plurality of louvers that are positioned adjacent corresponding inlets of the filter module, and wherein the wall enclosure includes a front side and a rear side, at least one of the front side and the rear side including a single door unit that is moveable between open and closed positions.

5. The inlet cooling system unit of claim 4, wherein the door unit is either:
 rotatably moveable between open and closed positions; or
 linearly moveable between open and closed positions.

6. The inlet cooling system unit of claim 1, wherein the chiller module includes a pump and plumbing that fluidly couples a coolant source to the pump, the pump and at least a portion of the plumbing disposed in the chiller module.

7. The inlet cooling system unit of claim 6, wherein the chiller module includes a wall enclosure having at least a first chilling coil unit that is integrated in the wall enclosure, the at least first chilling coil unit being fluidly coupled to the pump which circulates a coolant provided by the coolant source through the at least first chilling coil unit.

8. The inlet cooling system unit of claim 7, wherein the wall enclosure further comprises a second chilling coil unit that is integrated in the wall enclosure, the second chilling coil unit fluidly coupled to the pump which circulates the coolant provided by the coolant source through the second chilling coil unit.

9. A gas turbine inlet cooling system that receives inlet air, comprising:
 a coolant source that supplies a coolant;
 an inlet cooling system unit including:
 a chiller module having:
 a wall enclosure including a front side and a rear side, at least one of the front side and the rear side including a single door unit that is moveable between open and closed positions;
 at least a first chiller coil unit integrated with the wall enclosure, the first chiller coil unit configured to receive the inlet air; and
 a pump fluidly coupled to the coolant source, the pump circulating the coolant to the first chiller coil unit, flow of the inlet air through the chiller coil unit removing heat from the inlet air to generate cool inlet air;
 a filter module fluidly coupled to the chiller module, the filter module receiving cool inlet air from the chiller coil unit, the filter module including at least one filtration medium which receives the cool inlet air and filters the cool inlet air to generate filtered inlet air;
 a framework that includes a lower frame, the lower frame defining a floor of the inlet cooling system unit, an arrangement of the framework defining:
 a chiller module receiving region sized and shaped to receive the chiller module, the chiller module supportably received on the lower frame; and
 a filter module receiving region sized and shaped to receive the filter module, the filter module positioned above the chiller module relative to the floor of the inlet cooling system unit;
 a plurality of louvers that are positioned adjacent corresponding inlets of the filter module; and
 a gas turbine fluidly coupled to the filter module, the gas turbine receiving filtered inlet air.

10. The gas turbine inlet cooling system of claim 9, further comprising:
 a first inlet line that fluidly couples the pump to the first chiller coil unit, the first inlet line directing the coolant to the first chiller coil unit; and a first return line that fluidly couples the first chiller coil unit to the coolant source, the first return line directing the coolant to the coolant source.

11. The gas turbine inlet cooling system of claim 9, further comprising:
a second chiller coil unit integrated with the wall enclosure, the first and second chiller coil units located at opposing sides of the wall enclosure, flow of the inlet air through the second chiller coil unit removing heat from the inlet air to generate the cool inlet air.

12. The gas turbine inlet cooling system of claim 11, further comprising:
a second inlet line that fluidly couples the pump to the second chiller coil unit, the second inlet line directing the coolant to the second chiller coil unit; and
a second return line that fluidly couples the second chiller coil unit to the coolant source, the second return line directing the coolant to the coolant source.

13. The gas turbine inlet cooling system of claim 9, wherein the single door unit is either:
rotatably moveable between open and closed positions; or
linearly moveable between open and closed positions.

14. An inlet cooling system unit fluidly coupled to a gas turbine, the unit comprising:
a filter module configured to filter inlet air;
a chiller module configured to cool inlet air; and
a framework that includes:
a lower frame, the lower frame defining a floor of the inlet cooling system unit;
a plurality of corner vertical beams that are coupled to the lower frame, an arrangement of the lower frame and the plurality of corner vertical beams defining:
a chiller module receiving region sized and shaped to receive the chiller module, the chiller module supportably received on the lower frame; and
a filter module receiving region sized and shaped to receive the filter module, the filter module supportably coupled to the plurality of corner vertical beams to position the filter module above the chiller module relative to the floor of the inlet cooling system unit.

15. The inlet cooling system unit of claim 14, further comprising:
a plurality of louvers that are positioned adjacent corresponding inlets of the filter module, and wherein the chiller module includes a wall enclosure that surrounds the chiller module, the wall enclosure including a front side and a rear side, at least one of the front side and the rear side including a door unit that is moveable between open and closed positions.

* * * * *